Figure 1:
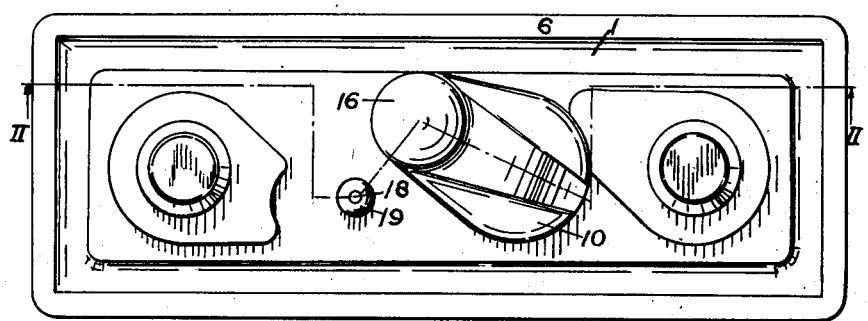

Aug. 18, 1953     J. R. MARTIN     2,649,494
VENT AND FILLING DEVICE FOR STORAGE BATTERIES
Filed July 24, 1950

Inventor,
John R. Martin
By
Attorney

Patented Aug. 18, 1953

2,649,494

UNITED STATES PATENT OFFICE 2,649,494

VENT AND FILLING DEVICE FOR STORAGE BATTERIES

John Ronald Martin, Denton, near Manchester, England, assignor to Oldham & Son Limited, Denton, near Manchester, England, a British company Application July 24, 1950, Serial No. 175,508
In Great Britain August 17, 1949

4 Claims. (Cl. 136—178)

This invention relates to electric accumulators.

The filler opening in the cover of an electric accumulator is usually closured by a stopper which is detachable from the cover when the filler opening is exposed. The stopper sometimes comprises lateral lugs which pass through opposed recesses in the filler opening and on part rotation engage under the top of the accumulator with a wedging action which causes the opening to be sealed, or it sometimes comprises a screwed stopper to be screwed into threads formed in the walls of the filler opening.

It has also been proposed to provide a cover for an electric accumulator having filler and vent openings, a tube surrounding the filler opening at the lower side of the cover extending downwards to the desired level of the electrolyte when the cell is in service and a member mounted on the cover and rotatable from a position in which it seals the filler opening to a position in which it seals the vent opening.

It is a main object of the present invention to provide in an electric accumulator a stopper which is non-detachable from the cover of the accumulator and which is seated in the filler opening when in its normal position with respect to the opening, the stopper being resiliently urged into engagement with the seating in the filler opening.

According to the invention there is provided an electric accumulator having a filler opening in a filling tube integral with a cover for the accumulator and extending into the accumulator to a point approximating to or slightly below the desired acid level, wherein a stopper is provided to enter and seat in the filler opening, the stopper being mounted for angular movement about a spindle secured to and extending outwards from the top of the cover, restrained against detachment from the spindle by an abutment extending laterally from the spindle, and urged into seating engagement with the filler opening by resilient means acting between the stopper and said abutment.

Further, according to the invention there is provided for an accumulator a cover having a filler opening in a filling tube integral with the cover, characterised in that a stopper is provided to enter and seat in the filler opening, the stopper being mounted for angular movement about a spindle secured to and extending outwards from the top of the cover, restrained against detachment from the spindle by an abutment extending laterally from the spindle, and urged into seating engagement with the filler opening by resilient means acting between the stopper and said abutment.

Another object of the invention is to provide improved means for facilitating the topping of accumulators and with this object in view an electric accumulator or a cover according to the invention has a vent in the cover spaced from the filler opening and communicating with the interior of the cover, the vent opening through a protuberance on the top of the cover and a compressible pad being movable with the stopper so that when the stopper is disposed over the vent the pad is urged by said resilient means into seating engagement with the vent.

The resilient means mentioned above may comprise a rubber washer.

In a construction having a vent in the cover as just mentioned, when the stopper is moved from its seating in the filler opening and is disposed above the vent there is no vent from the accumulator head space above the acid to the atmosphere once the level of the acid rises to the bottom of the tube. Consequently when water is poured into the tube to raise the acid level up to the lower end of the tube an air-lock is formed outside the tube in the head space of the accumulator and any further water poured into the filler opening is confined substantially to the tube. The level of the water can be seen by inspection as soon as it rises above the lower end of the tube and filling can then be stopped. The further amount of water so introduced cannot therefore much exceed the small contents of the tube and the tube may be filled to overflowing without materially exceeding the desired level in the accumulator. On moving the stopper from sealing relation with the vent the accumulator head space is vented and the water in the tube enters the accumulator so that the level of the electrolyte therein rises to a position slightly above the inner end of the filler tube.

Figure 2:
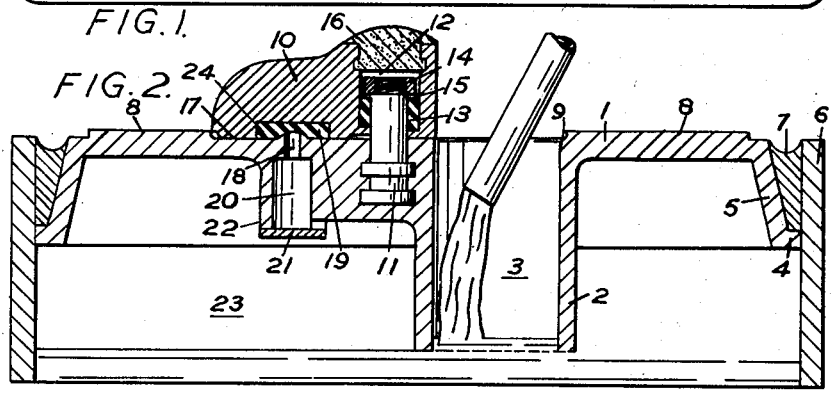
Figure 3:
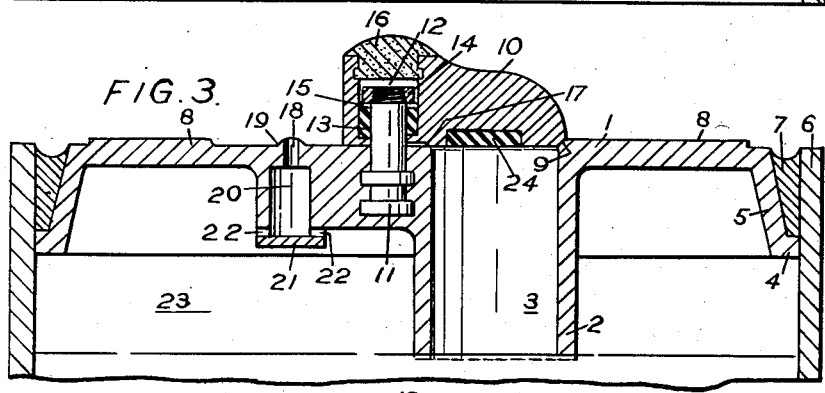
Figure 4:
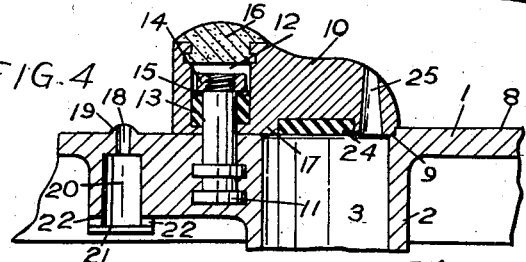

In order that the invention may be more clearly understood one embodiment thereof will now be described by way of example with reference to the accompanying diagrammatic drawing in which:

Fig. 1 is a plan of the top of an electric accumulator according to the invention, Fig. 2 is a part section on line II—II, Fig. 1, but with the stopper in its "open" position, and illustrates the method of topping up the accumulator, Fig. 3 is a part section similar to that of Fig. 2, but showing the stopper in its normal position, and Fig. 4 is a fragmentary section showing a modified form of stopper.

Referring to Figs. 1 to 3, the cover 1 for the accumulator is provided with an integral filling tube 2 provided with a filler opening 3. The tube 2 extends below the cover which has a lip 4 to space the cover flange 5 from the walls 6 of the accumulator to form a channel which is sealed in the usual manner as indicated by the reference 7. The filling tube 2 is so constructed that when the cover is fitted to an accumulator the inner end of the tube is adapted to extend into the accumulator to a point approximating to or slightly below the desired level for the electrolyte in the accumulator, as shown in Fig. 3.

The outer end of the filling tube 2 in which the filler opening 3 is formed, is disposed to be slightly below the upper level 8 of the top of the cover and is shaped to provide a seating 9 for a stopper 10.

Secured to the cover is a spindle 11 which, in a preferred construction, is made of lead. The cover may be of cast or moulded construction and, when so constructed, is cast or moulded round the base of the spindle so that the outer end of the spindle extends outwards from the top of the cover as shown in Figs. 2 and 3. Alternatively the spindle may be screwed or cemented into the cover.

The stopper 10 is fitted over the shank of the spindle and is provided with a bore to pass over the shank. A part 12 of the bore is of enlarged cross-section to house a resilient element 13, e. g. a rubber washer, which is positioned round the shank of the spindle. The outer end of the spindle is provided with screw-threads to receive a nut 14 which, together with a washer 15 acts as an abutment extending laterally from the spindle 11. The rubber washer is slightly compressed between the abutment and the bottom of the housing 12 in the stopper. When the washer 15 and nut 14 are in position the end of the spindle is upset by being riveted over, or soldered, or other suitable means may be employed to retain the nut 14 in position, so that the stopper is anchored against detachment from the cover 1.

The outer end of the bore 12 in the stopper 10 is closed by a sealing cap or plug 16 to prevent ingress of foreign matter and the cap or plug may be of known snap or screw-on construction.

The undersurface of the stopper is stepped to provide a portion 17 so shaped as to enter into the filler opening in the filling tube 2 and to be seated against the seating 9 formed at the top of the filler opening. When the stopper is seated with respect to the filler opening, as shown in Fig. 3, it is urged into and retained in this position by the action of the rubber washer 13 pressing the stopper downwards against the seating 9 at the top of the filler opening. The undersurface of the portion 17 of the stopper which enters the filler opening is inclined downwards from the axis of the spindle 11 to provide a lead to facilitate the lifting of the stopper out of the filler opening on rotation of the stopper about the spindle, during which movement the stopper is raised axially of the spindle against the action of the rubber washer 13.

In a construction designed to prevent overtopping of the accumulator, a vent 18 is formed in the cover about an axis parallel with the axis of the filling tube, the vent extending through the cover, opening from a protuberance 19 on the top of the cover, and being spaced apart from the filling tube 2. The outer end of the vent is of smaller diameter than the inner end portion 20 of the vent and the inner end portion is blocked by a bridge piece 21 provided with lateral apertures 22 extending radially from the portion 20 of the vent and opening into the head space 23 of the accumulator.

To effect a good sealing of the vent 18 the outer end of the vent is, as stated above, arranged to open from a protuberance 19 formed on the top of the cover and a compressible pad 24 comprising a rubber disc is inset in the underside of the stopper 10 for movement therewith. Thus when the stopper is rotated about the spindle 11 and is moved to a position at which it is disposed over the vent 18, as shown in Fig. 2, the downward pressure exerted by the rubber washer 13 causes the rubber disc 24 to be compressed about the protuberance 19 on the cover and to effect a good sealing of the vent 18.

When topping the accumulator the vent 18 in the cover is sealed by the compressible pad 24, as above described, and the water on rising to the bottom of the filling tube 2 produces an air-lock around the tube in the head space 23 beneath the cover and then rises up the tube as illustrated in Fig. 2.

The filling may be stopped as soon as the water is seen to rise above the lower end of the tube 2, but it is immaterial if filling be continued even till the tube is full. Thus overtopping is prevented whilst on rotating the stopper 10 about the spindle 11 to move the stopper out of sealing engagement with the vent 18 the air-lock is broken so that the water in the tube 2 is lowered into the accumulator as illustrated in Fig. 3.

If desired, as shown in Fig. 4, the stopper 10 may be provided with a vent 25 to vent the filling tube 2 when the stopper is in its normal position with respect to the filling tube.

From the foregoing it will be understood that constructions according to the invention provide a stopper which is secured against detachment from the cover of the accumulator and which, when in position with respect to the filler opening in the cover, is resiliently urged into engagement with a seating formed in the mouth of the filler opening.

I claim:

1. For an electric accumulator, a cover having a filler opening in a filling tube integral therewith to extend into an accumulator to a point approximating to or slightly below the desired acid level, in combination with a stopper seating formed by a recess disposed about the outer end of said filler opening to be somewhat lower than the upper level of said cover, a spindle secured to and extending outwards from the top of the cover, a rigid stopper movable angularly about and axially of the spindle, a stepped portion on the undersurface of said stopper adapted in one angular position of the stopper to fit within the said recess, an abutment extending laterally from the spindle to restrain the stopper against detachment from the spindle, and resilient means acting between said abutment and the stopper to urge the under surface of said stopper against the upper surface of said cover and, upon angular movement of said stopper about said spindle to or from said one angular position, respectively effect sealing engagement between said recess and said stepped portion on said stopper, or disengagement of said recess and said stepped portion.

2. For an electric accumulator, a cover having a filler opening in a filling tube integral therewith to extend into an accumulator to a point approximating to or slightly below the desired acid level, in combination with a stopper seating about said filler opening a spindle secured to and extending outwards from the top of the cover, a rigid stopper movable angularly about and axially of the spindle, an abutment extending laterally from the spindle to form a seat with said seating to restrain the stopper against detachment from the spindle resilient means acting between said abutment and the stopper to urge the stopper into sealing engagement with said seating, a protuberance on the top of the cover and bounding a vent communicating with the head space of the accumulator, and a compressible pad movable with the stopper to seal the outer end of said vent.

3. For an electric accumulator, a cover having a filler opening in a filling tube integral therewith to extend into an accumulator to a point approximating to or slightly below the desired acid level, in combination with a stopper seating formed by a recess disposed about the outer end of said filler opening to be somewhat lower than the upper level of said cover, a spindle secured to and extending outwards from the top of the cover, a rigid stopper movable angularly about and axially of the spindle, a stepped portion on the undersurface of said stopper adapted in one angular position of the stopper to fit within the said recess, an abutment extending laterally from the spindle to restrain the stopper against detachment from the spindle, and a rubber washer round the spindle and acting between said abutment and the stopper to urge the under surface of said stopper against the upper surface of said cover and, upon angular movement of said stopper about said spindle to or from said one angular position, respectively effect sealing engagement between said recess and said stepped portion on said stopper, or disengagement of said recess and said stepped portion.

4. For an electric accumulator, a cover having a filler opening in a filling tube integral therewith to extend into an accumulator to a point approximating to or slightly below the desired acid level, in combination with a stopper seating about said filler opening a spindle secured to and extending outwards from the top of the cover, a rigid stopper movable angularly about and axially of the spindle, an abutment extending laterally from the spindle to form a seat with said seating to restrain the stopper against detachment from the spindle, a rubber washer round the spindle and acting between said abutment and the stopper to urge the stopper into sealing engagement with said seating, a protuberance on the top of the cover and bounding a vent communicating with the head space of the accumulator, and a compressible pad movable with the stopper to seal the outer end of said vent.

JOHN RONALD MARTIN.

References Cited in the file of this patent

UNITED STATES PATENTS

| Number | Name | Date |
|---|---|---|
| 1,163,992 | Ford | Dec. 14, 1915 |
| 1,269,096 | Land | June 11, 1918 |
| 2,220,005 | Smith | Oct. 29, 1940 |
| 2,603,672 | Reppert | July 15, 1952 |

FOREIGN PATENTS

| Number | Country | Date |
|---|---|---|
| 23,647 | Australia | July 23, 1935 |